United States Patent
Choi et al.

(10) Patent No.: US 11,660,582 B2
(45) Date of Patent: May 30, 2023

(54) METHOD FOR PRODUCING A PELLET, PELLET, CATALYST CHARGE, AND STATIC MIXER

(71) Applicant: Alantum Europe GmbH, Munich (DE)

(72) Inventors: Byoungkwon Choi, Daejeon (KR); Jongkwang Kim, Seoul (KR); Jungsuk Bae, Seoul (KR); Andreas Tillmann, Unterhaching (DE); Lars Torkuhl, Munich (DE); Didier Béton, Munich (DE); Robin Kolvenbach, Munich (DE)

(73) Assignee: Alantum Europe GmbH, Munich (DE)

( * ) Notice: Subject to any disclaimer, the term of this patent is extended or adjusted under 35 U.S.C. 154(b) by 924 days.

(21) Appl. No.: 16/480,692

(22) PCT Filed: Jan. 30, 2018

(86) PCT No.: PCT/EP2018/052238
§ 371 (c)(1),
(2) Date: Jul. 25, 2019

(87) PCT Pub. No.: WO2018/141729
PCT Pub. Date: Aug. 9, 2018

(65) Prior Publication Data
US 2019/0388867 A1     Dec. 26, 2019

(30) Foreign Application Priority Data
Jan. 31, 2017   (EP) ..................... 17154045

(51) Int. Cl.
*B01J 19/30*     (2006.01)
*B01J 23/86*     (2006.01)
(Continued)

(52) U.S. Cl.
CPC ............. *B01J 19/30* (2013.01); *B01J 23/866* (2013.01); *B01J 35/026* (2013.01); *B01J 35/109* (2013.01);
(Continued)

(58) Field of Classification Search
None
See application file for complete search history.

(56) References Cited

U.S. PATENT DOCUMENTS 5,935,898 A  *  8/1999  Trubenbach ......... B01J 37/0018
                                                        502/232
2010/0033173 A1     2/2010  Gleich et al.
(Continued)

FOREIGN PATENT DOCUMENTS

JP        S6372738 A     4/1988
JP        62-144750 A    12/1988
(Continued)

OTHER PUBLICATIONS

Official Communication from Russian Patent Office for related Russian Application No. RU2019125833/04; dated Nov. 17, 2020; 3 pages.
(Continued)

*Primary Examiner* — Colin W. Slifka
(74) *Attorney, Agent, or Firm* — Dickinson Wright PLLC (57) ABSTRACT

The invention relates to a method for producing a pellet, in particular for a catalytic convertor and/or static mixer. The method comprises a trimming and/or deforming of at least one layer of metal foam material into a pellet shape.

8 Claims, 10 Drawing Sheets

(51) Int. Cl.
  *B01J 35/02* (2006.01)
  *B01J 35/10* (2006.01)
(52) U.S. Cl.
  CPC ....... *B01J 35/1076* (2013.01); *B01J 35/1085* (2013.01); *B01J 2219/30296* (2013.01); *B01J 2219/30491* (2013.01)

(56) References Cited

U.S. PATENT DOCUMENTS

| | | | |
|---|---|---|---|
| 2010/0331173 A1 | 12/2010 | Ebener et al. | |
| 2013/0168071 A1 | 7/2013 | Hugelier et al. | |

FOREIGN PATENT DOCUMENTS

| | | | |
|---|---|---|---|
| JP | H09202904 | A | 8/1997 |
| JP | 2005152708 | A | 6/2005 |
| JP | 2009279506 | A | 12/2009 |
| RU | 2193948 | C2 | 12/2002 |
| RU | 2315656 | C1 | 10/2003 |
| RU | 2239495 | C2 | 11/2004 |
| RU | 2003125636 | A | 2/2005 |
| SU | 533390 | A1 | 10/1976 |
| WO | 2016020053 | A1 | 2/2016 |
| WO | 2016021988 | A1 | 2/2016 |

OTHER PUBLICATIONS

Official Communication from the Japanese Patent Office for related Japanese Patent Application No. 2019-561360; dated Sep. 7, 2021; 5 pages.
Japanese Office Action with English translation dated Feb. 22, 2022 for Japanese Application No. 2019-561360, 9 pages.
Official Communication from the European Patent Office for related European Patent Application No. 17154045.3; dated Jul. 28, 2017; 7 pages.
Kim, S. & Lee, C., A review on manufacturing and application of open-cell metal foam, Procedia Materials Science, 2014, p. 305-309, v. 4, Elsevier, NC.
Yu, X., Wen, Z., Lin, Y., Tu, S., Wang, Z. & Yan, J., Intensification of biodiesel synthesis using metal foam reactors, Fuel, 2010, p. 3450-3456, v. 89, Elsevier, NC.
Chinese Office Action with English translation dated Jul. 27, 2022 for Chinese Application No. 2018800093835, 4 pages.
Micro-Nanometer Energetic Materials, 1st Edition, Ren Hui et al., Beijing Institute of Technology Academic Press, p. 190, Publication Date Apr. 2015, 3 pages.

* cited by examiner

METHOD FOR PRODUCING A PELLET, PELLET, CATALYST CHARGE, AND STATIC MIXER

CROSS-REFERENCES TO RELATED APPLICATIONS

This patent application is a 371 of International Application No. PCT/EP2018/052238, filed Jan. 30, 2018 which claims the priority of European Application No. 17154045.3, filed Jan. 31, 2017, each of which are incorporated herein by reference in their entirety.

The present invention relates to a method of producing a pellet, to a pellet, to a catalyst charge, and to a static mixer having a plurality of pellets.

Methods of producing ceramic pellets are generally known. A strand is, for example, first produced by means of extrusion and is subsequently cut up to obtain individual pellets. Such pellets can be used as catalysts. Monolithic catalysts are also known that comprise ceramics, metal foam, networks, or so-called honeycomb structures.

Metal foam can be produced, for example, as described in WO 2016/020053 A1. In this respect, a polyurethane foam is first galvanized with a metal. The polyurethane foam is subsequently removed by pyrolysis so that a metal foam material is obtained. This metal foam material can finally be converted into a metal foam by a subsequent sintering. Prior to the sintering a metal powder can also be applied to the metal foam material that can then, for example, form an alloy in the form of a metal foam on the sintering with the metal foam material.

A catalyst charge has a decisive influence on the fluid dynamics in a reactor and thus on the heat transfer and mass transfer and on the pressure loss. A denser catalyst bed thus, for example, leads to an increased pressure loss. At the same time, the mass transfer can be particularly good in a denser catalyst bed since the densely packed catalyst charge generates a great deal of turbulence, which is accompanied by an improved convective heat transfer.

The heat transfer is a decisive parameter that has to be optimized both for endothermic and for exothermic reactions and that significantly influences the heat supply and removal property of a reactor. The heat transfer is limited in dependence on the temperature range in a chemical reactor by conduction, convection, or radiation. There is a tendency to the effect that the contribution of the heat transfer by radiation increases as the temperature increases. Examples for methods that are limited by the heat transfer due to radiation are methods that are based on extremely endothermic reactions such as steam reforming. The challenge in these methods is to introduce sufficient thermal energy into the reactor to instigate the chemical reactions. Typical reaction temperatures are above 900° C. At temperatures of less than 800° C. the heat transfer is typically limited by convection. The convection is highly dependent on fluid dynamics and is promoted in turbulent flows. A typical parameter for the turbulence in a reactor is the Reynolds number.

To participate in chemical reactions in a porous material, it is necessary that a fluid moves to catalytically active centers of the porous material. The mass transfer to such catalytically active centers in porous materials is mainly determined by how large the portion of the fluid is that penetrates into the porous material or by how much of this fluid flows past the porous material without penetrating into the pores.

One of the most important parameters for the costs of a chemical process is the pressure loss. The higher the pressure loss is, the higher the required effort to convey a fluid through a reactor. The operating costs of a reactor thus also increase as its pressure loss increases. However, a certain pressure loss is indispensable to generate desired turbulent flows in a reactor.

It is understood that the above considerations on fluid dynamics also apply accordingly to static mixers such as in absorption columns or distillation columns.

It is the underlying object of the invention to provide a method in accordance with which pellets can be produced by which the fluid dynamics in reactors or columns can be optimized and set in a targeted manner so that the heat transfer and mass transfer as well as the pressure loss in a reactor or in a column can hereby be optimized.

A method having the features of claim 1 is provided to satisfy the object.

The method in accordance with the invention of producing a pellet, in particular for a catalyst and/or for a static mixer, comprises a cutting to shape and/or shaping of at least one layer of metal foam material into a pellet form.

The method in accordance with the invention permits an economical and controlled production of pellets having different shapes. The design freedom with respect to the geometry and size of the pellets provided by the method permits different packings of catalyst beds and/or of static mixers with adapted fluid dynamics so that the heat transfer and mass transfer as well as the pressure loss in a reactor can be optimized.

Advantageous embodiments of the invention can be seen from the dependent claims, from the description and from the drawing.

In accordance with an embodiment, the metal foam material is sintered, for example to convert a metal foam material comprising different metals into a metal alloy foam. The sintering can, for example, take place at a temperature of 500° C. to 1200° C. in an oxidative or reductive atmosphere. Different alloys can hereby be obtained that can have optimized properties for the planned purpose of use of the pellets.

The stability of the pellets is additionally increased by the sintering, whereby pellet shapes can be implemented that are not possible with pellets composed of ceramic materials. The high stability of the pellets additionally permits a very fast and efficient packing of the catalyst bed; in addition, higher packing densities can be achieved. The same applies accordingly to static mixers set up from individual pellets.

In accordance with a variant of the method, the shaping into pellets is carried out by the cutting to shape and/or shaping prior to sintering. Alternatively, however, it is equally possible to carry out the step of cutting to shape and/or shaping only after sintering. The optimum order of the steps ultimately depends on the desired pellet shape.

The metal foam is preferably an open-pore metal foam. It is hereby possible for fluids such as gaseous reactants to penetrate through the total pellet and to participate in reactions within the pellet. In accordance with a preferred embodiment, the metal foam comprises a catalytically active material that can catalyze heterogeneous reactions and is in particular suitable for converting gaseous reactants.

The metal foam preferably comprises at least one of the elements Ni, Fe, Cr, Al, Nb, Ta, Ti, Mo, Co, B, Zr, Mn, Si, La, W, Cu, Ag, Au, Pd, Pt, Zn, Sn, Bi, Ce, and/or Mg. The metal foam particularly preferably comprises at least one of the elements Ni, Fe, Cr and/or Al and very particularly preferably at least one of the elements Ni and/or Al. A plurality of these elements can together form a component of the metal foam as an alloy or can be present as particles on the metal foam.

The metal foam preferably has pores having diameters that are distributed in a monomodal or multimodal manner, in particular in a bimodal manner. In accordance with a particularly preferred embodiment, the pores are distributed in a multimodal manner and are spatially arranged within the pellet such that pores are present in a first region of the pellet having larger diameters than in a second region of the pellet spatially separate therefrom. Pores having different diameters can be used to influence the dwell time of reactants and products within a pellet. The formation of turbulence can also be influenced by pores that differ with respect to their sizes, types, or geometries, whereby the heat transfer and mass transfer can be influenced.

In accordance with a particularly preferred further development of the method in accordance with the invention, at least two layers of different metal foam material are provided. Layers of metal foam materials are inter alia also considered as different that differ with respect to the orientation of the pores contained therein, that comprise different materials, that differ with respect to their thicknesses and/or that have different gas permeabilities. It is in particular preferred that the at least two different layers differ with respect to their porosities, their pore diameters, their material compositions and/or their gas permeabilities. The fluid dynamic properties of the pellet can be set in a targeted manner by the use of different layers and thus of the heat transfer and mass transfer as well as the pressure loss in a reactor that has a catalyst having a plurality of such pellets or in an absorption column or distillation column having a static mixer composed of a plurality of such pellets.

The two layers of metal foam material can, for example, be connected to one another by pressing and/or by soldering by means of a soldering film. A pressing permits to layers to be connected without using an additional material that could possibly be disruptive on a use of the resulting pellet as a catalyst charge and/or as a static mixer. The user of a soldering film makes it possible to insert a solder compound into the pellets in a targeted manner, by which compound, for example, the fluid dynamics within the pellet can be controlled.

For example, the cutting to shape and/or shaping of the at least one layer of the metal foam material takes place by means of laser cutting, waterjet cutting, spark erosion, machining, in particular sawing, drilling, turning, or grinding, controlled crushing, twisting, rolling, pressing, folding, heat treatment, in particular welding with an arc, separation welding, or treatment with a soldering lamp, chemical treatment, in particular leaching or separation.

The pellet preferably has a volume of 0.5 mm$^3$ to 30 cm$^3$, particularly preferably of 0.8 mm$^3$ to 15 cm$^3$, and very particularly preferably from 2 cm$^3$ to 10 cm$^3$. With a pellet having a volume of less than 0.5 mm$^3$ there is a risk that they are carried out of the reactor by the reactant flow, in particular on a use as a catalyst for heterogeneous reactions. A pellet having a volume of less than 0.5 mm$^3$ additionally only generates a little turbulence in a reactor and thus contributes little to the convective heat transfer and mass transfer. Catalyst charging processes using pellets that have a volume of more than 30 cm$^3$ in contrast form empty spaces that are disadvantageous for the convective heat supply and removal and in particular contribute to unwanted hot spots and to a reduction of the process stability in highly exothermic reactions. On the other hand, empty spaces can promote the heat supply and removal by radiation at temperatures of more than 800° C. The heat supply and removal can accordingly be optimized for all process conditions by the targeted influencing of the size or number of the empty spaces.

The metal foam material preferably has pores that have diameters of 10 μm to 10,000 μm, preferably of 50 μm to 3000 μm, very particularly preferably of 100 μm to 1500 μm. Pores having diameters of less than 10 μm result in a deterioration of the mass transfer properties. Better heat transfer properties and mass transfer properties can be achieved using metal foam material that has a pore diameter of 10 μm or more. However, with pores having a diameter of more than 10,000 μm the efficiency of a reactor having such pellets as the catalyst charge is reduced due to a reduced ratio of a catalytically active surface provided by the metal foam to the inner volume of the pores.

The porosity of the pellet is preferably greater than or equal to 70%, particularly preferably greater than or equal to 80%, and very particularly preferably greater than or equal to 85%. They are consequently pellets of highly porous material. The porosity here designates the quotient from the volume of the pores in a pellet to the total volume of the pellet. It has been found that a porosity of less than 70% has a negative effect on the mass transfer and on the pressure loss when such a pellet is used in a catalyst bed. The porosity is here determined by means of an image analysis with reference to a transverse cross-section of the pellet. A transverse cross-section of the pellet is prepared for this purpose and an image is taken of it. To determine the porosity, the image surfaces with and without material, i.e. the material regions and the hole regions, are put into relationship with one another. A porosity of 50%, for example, means that the surfaces with and without material are of equal size in the taken image. The higher the proportion of the surface without material in the taken image, the higher the porosity of the pellet.

It is understood that due to a suitable form of the pellet, a static mixer set up therefrom can also be ideally adapted to its respective application, for example in an absorption column or in a distillation column.

A further subject matter of the invention is a pellet that comprises at least one layer of metal foam and can in particular be obtained in accordance with one of the above-described methods. The pellet can, for example, be provided for a catalyst charge and/or for a static mixer, for example for an absorption column or distillation column.

The metal foam is preferably an open-pore metal foam. It is hereby possible for gaseous reactants to penetrate through the total pellet and to participate in reactions within the pellet. In accordance with a preferred embodiment, the metal foam comprises a catalytically active material that can catalyze heterogeneous reactions and is in particular suitable for converting gaseous reactants.

In accordance with a first variant, the pellet comprises at least one outer-side indentation, one outer-side groove and/or at least one winding and/or twist of a layer of metal foam. The fluid dynamics can be influenced in a manner suitable for the respective application by this shape and the heat transfer properties and the mass transfer properties of a reactor or of a column can be optimized.

A second variant of the pellet provides that at least one outer surface and/or one inner boundary surface of the pellet is at least partly closed. A closed outer surface is understood as an outer surface of a pellet that does not have any pore openings so that gaseous reactants cannot enter into the pellet or escape from the pellet through them. A closed inner boundary surface of a pellet accordingly designates a surface in the interior of the pellet that is not penetrated by pores.

Such an inner boundary surface can, for example, exist between two layers of metal foam that are connected to one another while using a soldering film. Such partly closed outer surfaces and/or inner boundary surfaces can contribute to turbulence in a gas flow flowing through the reactor or the column and can influence the fluid dynamics, whereby ultimately the heat transfer properties and mass transfer properties of a reactor or of a column can be optimized.

In accordance with a third variant, the pellet comprises at least two different layers of metal foam. Different properties can be combined in a pellet using different layers of metal foam, whereby the fluid dynamics and thus the heat transfer properties and mass transfer properties and the pressure loss of a reactor or of a column can in turn be optimized.

The first, second, and third variants do not preclude one another, but can rather also be present in combination so that in one variant the pellet comprises at least one outer-side indentation, an outer-side groove and/or at least one winding and/or twist of a layer of metal foam and at least one outer surface and/or one inner boundary surface of the pellet is at least partly closed. In accordance with a further variant, the pellet comprises at least one outer-side indentation, an outer-side groove and/or at least one winding and/or twist of a layer of metal foam and at least two different layers of metal foam, with at least one outer surface and/or one inner boundary surface of the pellet being at least partly closed. Provision is made in accordance with a further alternative that the pellet comprises at least one outer-side indentation, an outer-side groove and/or at least one winding and/or twist of a layer of metal foam and at least two different layers of metal foam. Finally, the pellet can comprise at least two different layers of metal foam and at least one outer surface and/or one inner boundary surface of the pellet can be at least partly closed.

The pellet preferably comprises a metal foam preferably comprising at least one of the elements Ni, Fe, Cr, Al, Nb, Ta, Ti, Mo, Co, B, Zr, Mn, Si, La, W, Cu, Ag, Au, Pd, Pt, Zn, Sn, Bi, Ce, and/or Mg. The metal foam particularly preferably comprises at least one of the elements Ni, Fe, Cr and/or Al and very particularly preferably at least one of the elements Ni and/or Al. A plurality of these elements can form an alloy and can make up a component of the metal foam or the total metal foam. In addition, these elements can be included in particles that are present within the metal foam. The metal foam particularly preferably comprises a nickel-iron-chromium-aluminum alloy and/or a nickel-chromium-aluminum alloy. The nickel-iron-chromium aluminum alloy and/or the nickel chromium aluminum alloy can be doped with further elements to set and optimize the catalytic activity.

Very particularly preferably the metal foam at least substantially comprises a nickel-iron-chromium-aluminum ally and/or a nickel-chromium-aluminum alloy. This means that, except for a possibly doped nickel-iron-chromium-aluminum alloy and/or a nickel-chromium-aluminum alloy, the metal foam only includes unavoidable contaminants and/or residues of a soldering film possibly used in the production.

In accordance with an embodiment, the metal foam has pores having diameters that are distributed in a monomodal or multimodal manner, in particular a bimodal manner.

The pores in the pellet preferably have diameters of 10 μm to 10,000 μm, preferably of 50 μm to 3000 mm, very particularly preferably of 100 μm to 1500 μm. Pores having diameters of less than 10 μm can lead to an increased pressure loss and can impede the heat transfer and mass transfer. Considerably better heat transfer properties and mass transfer properties as well as a reduced pressure loss can be achieved using pellets that have pore diameters above 100 μm. However, with pores having a diameter of more than 10,000 μm the efficiency of a reactor having such pellets as the catalyst charge is reduced due to a reduced ratio of a catalytically active surface provided by the metal foam to the inner volume of the pores.

The present invention also relates to a catalyst charge having a plurality of pellets in accordance with at least one of the above-described aspects.

The catalyst charge in accordance with the invention can, for example, be used in a heterogeneously catalyzed reaction. The reactants and products of the heterogeneously catalyzed reaction can be present in gaseous and/or liquid form here. The catalyst charge in accordance with the invention can furthermore be used in the conversion of natural gas in longer chain hydrocarbons, in the hydrogenation/dehydrogenation of hydrocarbons, in particular in steam reformation, in oxidation reactions, in particular in partial ethylene oxidation.

Yet a further subject matter of the invention is a static mixer, for example for an absorption column or for a distillation column, having a plurality of pellets of the above-described kind.

In accordance with an embodiment, the plurality of pellets of the catalyst charge or of the static mixer comprise different pellets, in particular pellets that differ with respect to their sizes, shapes, surfaces, densities, porosities and/or their materials. It is hereby possible to influence the fluid dynamics and thus the heat transfer and mass transfer in a suitable manner and thus to optimize the heat supply and removal properties of the reactor.

In accordance with a further embodiment, the different pellets are uniformly distributed in the catalyst charge or in the static mixer. In accordance with another embodiment, the distribution of the different pellets has a gradient in an axial direction and/or a gradient in a radial direction. The axial direction designates the direction from a reactor inlet or a column inlet to a reactor outlet or a column outlet and the radial direction designates the direction transverse to the axial direction. In accordance with yet a further embodiment, the distribution of the different pellets has discrete layers in the axial direction and/or in the radial direction. A variation of the composition of the catalyst charge or of the static mixer in the radial direction makes it possible to influence the heat supply and removal properties in a targeted manner up to and into the interior of the reactor or of the column and thus to correspondingly optimize the reactor or the column. A change of the composition of the catalyst charge or of the static mixer in the axial direction enables an adaptation of the fluid dynamics to a composition of the reactor flow changing in the axial direction.

The invention will be described in the following purely by way of example with reference to possible embodiments and to the enclosed drawing. There are shown:

FIG. 22b mean heat transfer coefficients of the reactors of FIG. 21a.

Figure 1:
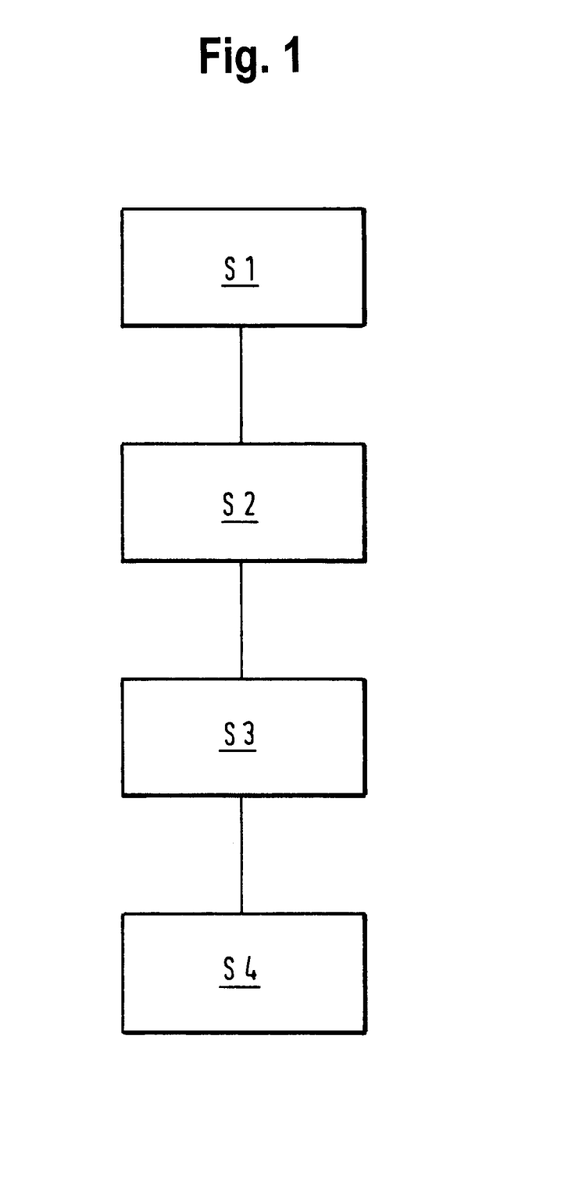
FIG. 1 a schematic representation of a method in accordance with the invention.

FIG. 1 schematically shows the method steps of a method of producing pellets 10 such as are shown, for example, in FIGS. 2 to 16c. First, in a first method step S1, a layer 12 or a stack of a plurality of layers 12 of metal foam material 14 stacked above one another is provided that is subsequently comminuted in a second method step S2 into metal foam material pieces 18 that are then shaped into pellet-like metal foam blanks 16 in a third method step S3. The metal foam blanks 16 are further processed into finished pellets 10 by a subsequent sintering in a fourth method step S4. The pellets 10 thus obtained have a high mechanical stability and can, as described in the following, be used for producing a catalyst charge 20 of a reactor 22. In accordance with an alternative use, however, it is equally possible to set up a static mixer, for example for an absorption column or a distillation column, from the pellets 10. It is understood that in dependence on the configuration of the pellets 10, a static mixer can also satisfy a catalyst function or conversely a catalyst charge 20 can simultaneously act as a static mixer.

To form pellet-like metal foam blanks 16 from the metal foam material 14, different techniques can be made use of, for example, laser cutting, waterjet cutting, spark erosion, machining, in particular sawing, drilling, turning, or grinding, controlled crushing, twisting, winding, rolling, pressing, folding, heat treatment, in particular welding with an arc, separation welding, or treatment with a soldering lamp, chemical treatment, in particular leaching or separation.

Figure 7:
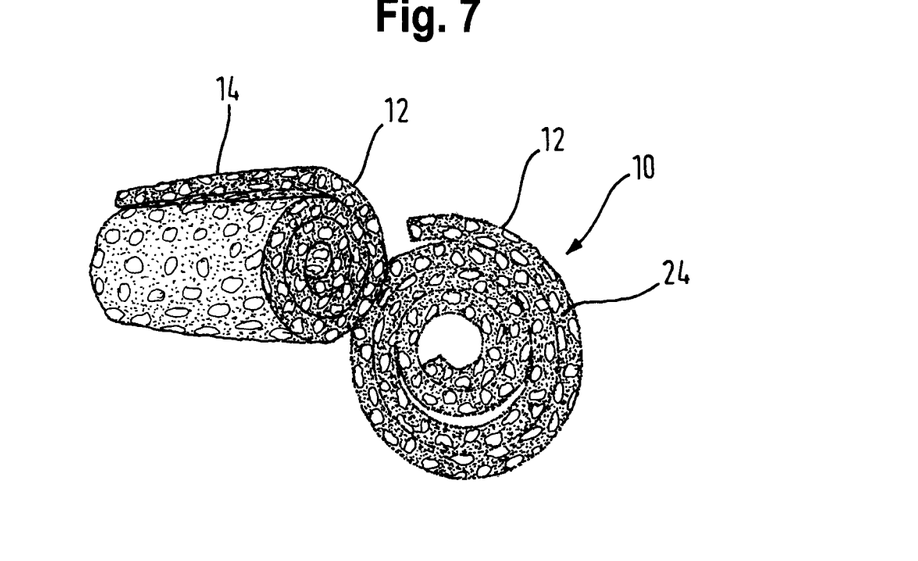
FIG. 7 a further embodiment of a pellet in accordance with the invention and a shaped metal foam material.
Figure 8:
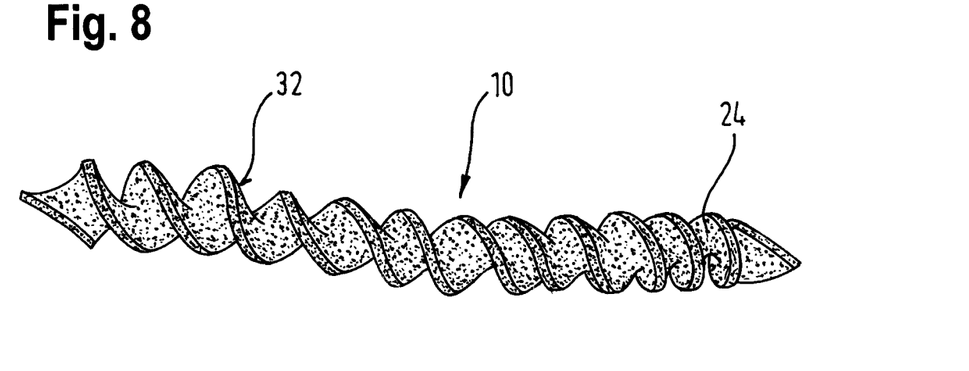
FIG. 8 a further embodiment of a pellet in accordance with the invention.

It can also be advantageous in the production of pellet-like metal foam blanks 16 having a helical shape such as shown in the middle of FIG. 7 to first shape and subsequently comminute the metal foam material 14. Depending on the shape that is desired for the pellet 10, it can generally be advantageous to carry out the second method step S2 and the third method step S3 in reverse order, i.e. to first fold, roll, twist and/or press in the metal foam material 14 and subsequently to cut it up to obtain pellet-like metal foam blanks 16 in the desired size. The pellet-like metal foam blanks 16 then become the pellet 10 of metal foam 24 by the sintering (method step S4).

In accordance with an alternative embodiment, it is moreover conceivable to carry out the method step S4 before the method steps S2 and S3. With this alternative, the layer 12 of metal foam material 14 is therefore first sintered and subsequently comminuted as described above and shaped to finished pellets 10.

Figure 2:
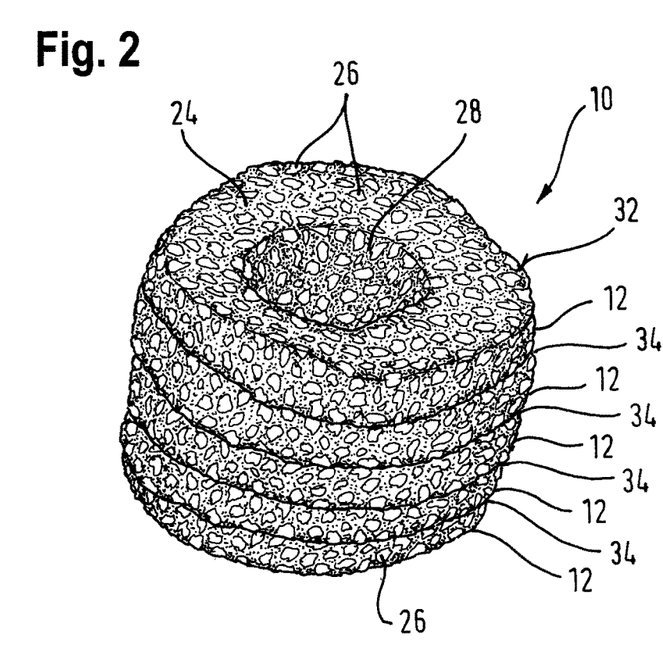
FIG. 2 an embodiment of a pellet in accordance with the invention.

The pellet 10 shown in FIG. 2 composed of metal foam 24 having open pores 26 has an approximately cylindrical base shape and in the central region of its end face has an indentation 28 that results from a pressing in of the metal foam material 14. It is conceivable that the end face of the pellet 10 that is not visible in FIG. 2 and that is disposed opposite likewise also has an indentation 28. Alternatively, the indentation 28 can also be configured as an indentation that extends axially through the total pellet 10, whereby the pellet 10 is given the shape of a Raschig ring. The pellet 10 of FIG. 2 has a plurality of layers 12 of metal foam 24 that are stacked above one another and that are connected to one another. The connection of the individual layers 12 can take place, for example, by pressing or by soldering with the aid of a soldering film 30. An outer surface 32 of the pellet 10 has a plurality of peripheral grooves 34. The grooves 34 can influence the fluid dynamics in that they deflect a reactant flow 36 flowing through the reactor 22 (cf. FIGS. 18 and 20) and generate turbulence therein. In addition, the grooves 34 increase the outer surface 32 of the pellet 10 so that the reactant flow 36 can more easily penetrate into the open-pore metal foam 24, whereby the mass transfer properties are improved. The pellet 10 of FIG. 2 has a high density due to its compact shape, which has an advantageous effect on the heat transfer properties.

Figure 3:
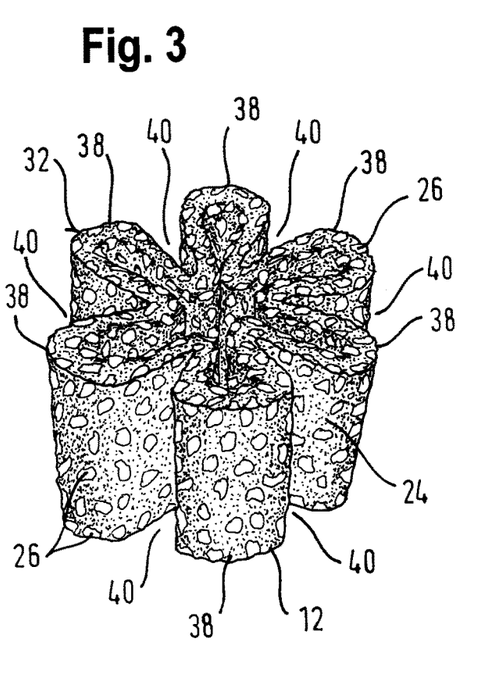
FIG. 3 a further embodiment of a pellet in accordance with the invention.
Figure 4:
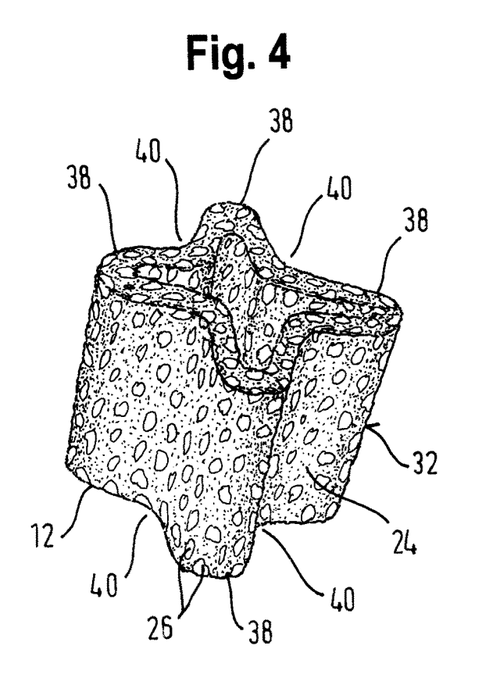
FIG. 4 a further embodiment of a pellet in accordance with the invention.

The pellet 10 shown in FIG. 3 was produced by multiple folding of a layer 12 of metal foam material 14 and has six protrusions 38 and six indentations 40 that extend in parallel with one another and that extend axially over the length of the pellet 10. The pellet 10 of metal foam 24 shown in FIG. 4 having four protrusions 38 and four indentations 40 can be produced in a similar manner. In the central region, the two pellets 10 shown in FIG. 3 and FIG. 4 each have a free passage that extends axially through the total pellet 10. The protrusions 38 and indentations 40 produced in these pellets 10 by the folding can cause turbulence in a reactant flow and can thus improve the heat transfer properties of a corresponding catalyst bed in comparison with pellets 10 without protrusions 38 and indentations 40. The centrally arranged passage here effects a reduction in the pressure loss.

Figure 5:
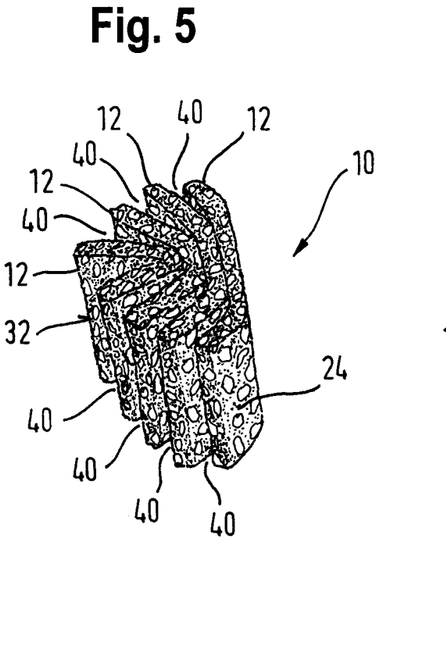
FIG. 5 a further embodiment of a pellet in accordance with the invention.
Figure 6:
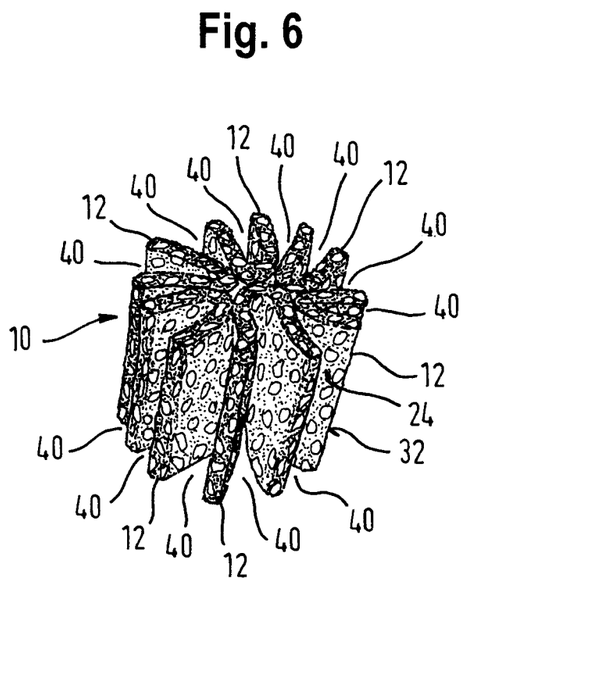
FIG. 6 a further embodiment of a pellet in accordance with the invention.

Seven indentations 40 are represented in the multilayer pellet 10 shown in FIG. 5 and twelve indentations 40 in the pellet 10 shown in FIG. 6 that were obtained by bending up individual layers 12 of metal foam material 14 and that extend axially. These indentations 40 cause turbulence and thus improve the heat transport properties of a corresponding catalyst bed in comparison with a catalyst bed having pellets 10 without these indentations 40.

All the pellets 10 shown in FIGS. 3 to 6 have a compact structure so that a high density can be achieved with a statistical packing of a catalyst bed having such pellets 10, which is in turn advantageous for the heat transfer properties and mass transfer properties and can effect a high degree of turbulence.

It is also possible to first roll up one or more layers 12 of the metal foam material 14, as shown at the left in FIG. 7, then to sinter them and subsequently to cut them into disks. A helical pellet 10 can hereby be obtained such as is shown at the right in FIG. 7. It is ensured here by the sintering of the rolled up metal foam material 14 that the metal foam material 14 does not unroll again on cutting up.

The helical pellet 10 is very compact, which has an advantageous effect on the heat transfer properties and mass transfer properties. The mass transfer properties of such helical pellets 10 are in particular improved due to the short transfer distances. An axial passage that can reduce the pressure loss of a corresponding catalyst bed is produced in the inner region of the pellet 10 by the rolling up. A statistical packing of a catalyst bed with helical pellets 10 produces particularly strong turbulence. However, an ordered packing can also be implemented in addition to a statistical packing by the helical pellets 10. The helical pellets 10 can thus be stacked to improve the heat transfer and mass transfer in the catalyst bed to generate channels in a targeted manner in the catalyst bed to hereby configure flow profiles in the catalyst bed.

Spiral pellets 10 can also be produced by twisting or winding strip-like metal foam material 14. The pellet 10 shown in FIG. 8 has been turned by twisting into a spiral shape. A reactant flow 36 flowing along the pellet 10 can be set into rotation by the spiral shape of the pellet 10. Such an influencing of the fluid dynamics can be utilized to improve the heat transfer property and the mass transfer property of a catalyst bed. The pellet 10 has a comparatively large free volume due to the spiral shape, which reduces the pressure loss. With a vertical arrangement of spiral pellets 10 in a catalyst bed in which the longitudinal axis of the pellets 10 is aligned in parallel with the direction of flow in the catalyst bed, flow profiles can be generated in a targeted manner. Very turbulent flows can be achieved with a statistical packing.

Figure 9:
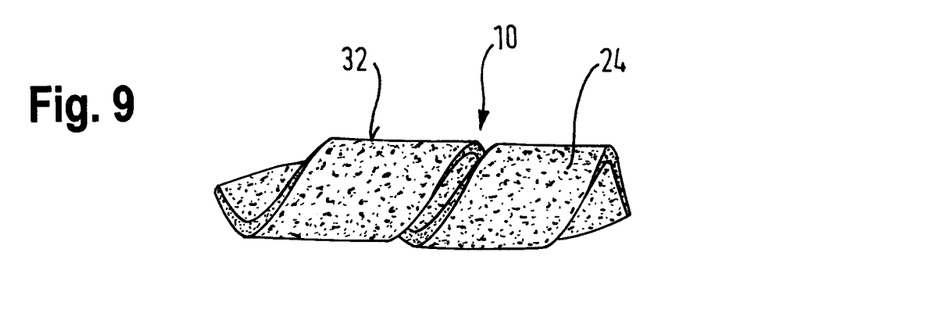
FIG. 9 a further embodiment of a pellet in accordance with the invention.
Figure 10:
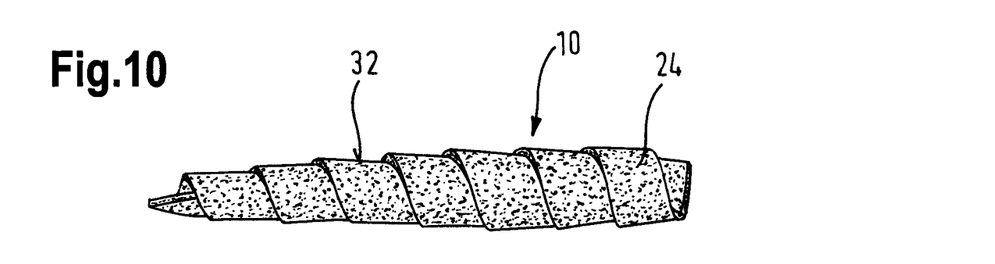
FIG. 10 a further embodiment of a pellet in accordance with the invention.

Pellets 10 having the shapes shown in FIGS. 9 and 10 can be obtained by a winding of a strip of metal foam material 14, wherein passages that are free of metal foam 24 and that reduce the pressure loss in a corresponding catalyst bed are produced by the winding up in the interior of these pellets 10.

Figure 11:
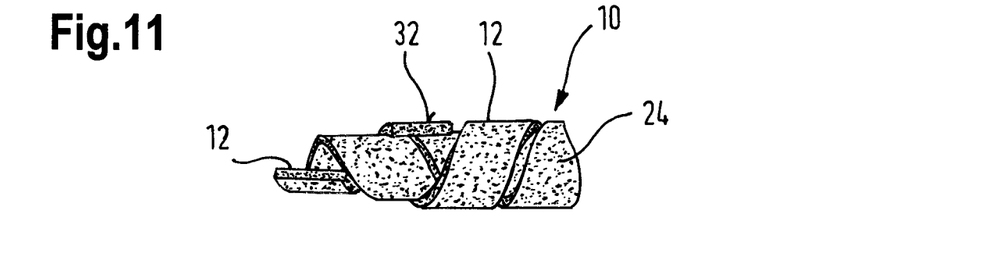
FIG. 11 a further embodiment of a pellet in accordance with the invention.

Different layers 12 of metal foam of a pellet 10 can also be twisted or wound in opposite directions to produce a pellet 10 as shown in FIG. 11. Due to the different directions of twisting or winding of the different layers 12, a reactant flow 36 flowing past the pellet 10 experiences deflections in different directions, whereby the fluid dynamics can be influenced in a targeted manner, for example by the generation of turbulence. Such an influencing of the fluid dynamics can likewise be utilized to optimize the heat transfer property and the mass transfer property of a catalyst bed in a targeted manner.

Figure 12:
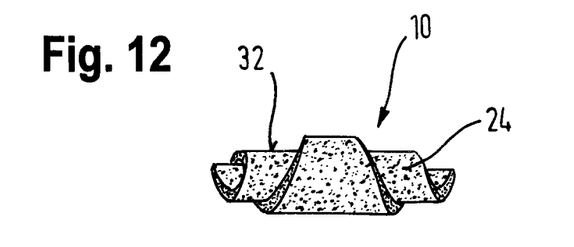
FIG. 12 a further embodiment of a pellet in accordance with the invention.
Figure 13:
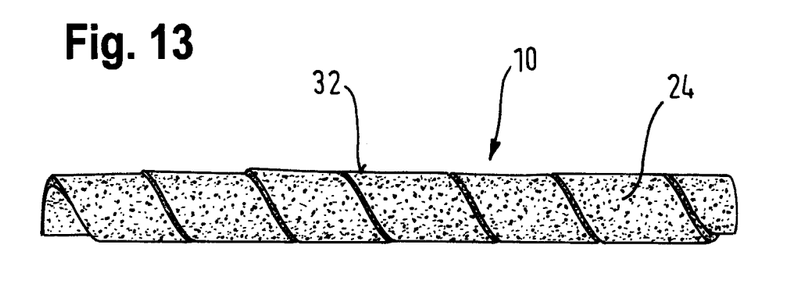
FIG. 13 a further embodiment of a pellet in accordance with the invention.

Pellets 10 having the shapes shown in FIGS. 12 and 13 can be produced by the winding of metal foam material 14. The pellet 10 shown in FIG. 12 can be produced by a winding up of a triangular metal foam material 14. The winding up of a strip of metal foam material 14 can be used to provide a pellet 10 with the almost bar-shaped form shown in FIG. 13, with an axial passage that is free of metal foam 24 and that reduces the pressure loss in a corresponding catalyst bed being produced by the winding up in the interior of the pellet shown in FIG. 13.

Figure 14:
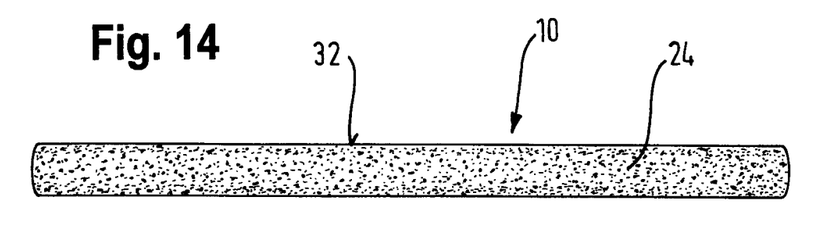
FIG. 14 a further embodiment of a pellet in accordance with the invention.

The pellets 10 of FIGS. 7 to 13 each have a structure at their outer surfaces 32 that is due to twisting or winding and that is suitable to lead off and to swirl a reactant flow 36 flowing past it. Turbulence can thus be produced in the reactant flow 36 in a targeted manner using such pellets. Depending on the type of twisting or winding, different outer surfaces 32 can be produced so that a pellet 10 can be obtained that is tailored in dependence on the purpose of use. It may be desired under certain circumstances to generate less turbulence in the reactant flow 36. It can be advantageous for this purpose, for example, to use the almost bar-shaped pellet 10 shown in FIG. 13 that has a relatively smooth outer surface 32. An even smoother outer surface 32 can be achieved in that a bar-shaped or cylindrical pellet 10 such as shown in FIG. 14 is used. The pellets 10 shown in FIGS. 9 to 14 are very compact, which is in particular advantageous for the heat transfer.

Very densely packed catalyst beds can be obtained and flow profiles can be produced in a targeted manner in the catalyst bed by a vertical packing of the pellets 10 shown in FIGS. 9, 10, 13, and 14, which is particularly advantageous for the heat transfer properties. Turbulent flows can be produced by means of statistical packing of these pellets, which is advantageous for the heat transfer and mass transfer.

Figure 15:
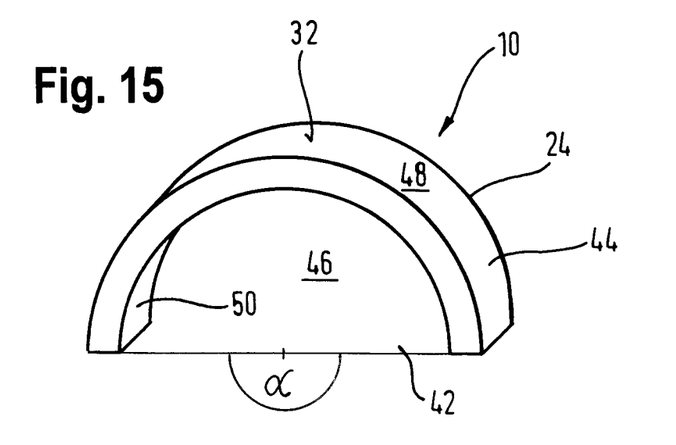
FIG. 15 a further embodiment of a pellet in accordance with the invention.

The pellet 10 shown in FIG. 15 has the shape of an open hollow cylinder with an opening angle $\alpha$ of 180° and an axial opening 42 in a jacket wall 44. Different opening angles in the range from 1° to 359° are also possible. An opening angle $\alpha$ of 0° corresponds to a hollow cylinder. A pellet 10 in the form of an open hollow cylinder can be produced, for example, by rolling metal foam material 14. The opening 42 provided in the jacket wall 44 allows the reactant flow 36 to penetrate into the inner jacket surface 46 of the hollow cylindrical pellet 10. The pellet 10 shown in FIG. 15 can thus conduct the reactant flow 36 in a similar manner to a pipe, whereby a very small pressure loss can be achieved. Indentations 40 and/or grooves 34 that are, however, not shown in FIG. 15 can be provided at the outer jacket surface 48 and/or at the inner jacket surface 46 of the open hollow cylinder for a further influencing of the fluid dynamics. A targeted generation of flow profiles in a catalyst bed is likewise possible by an ordered packing of a catalyst bed with the pellets 10 shown in FIG. 15.

Figure 16A:
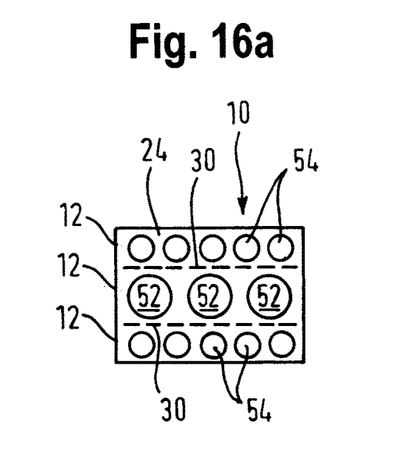
FIG. 16a a cross-sectional view of an embodiment of a pellet in accordance with the invention with three different layers.
Figures 16B, 16C:
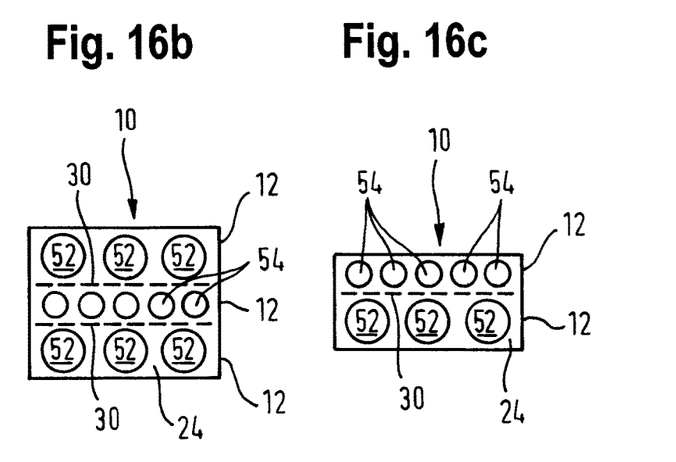
FIG. 16b a cross-sectional view of a further embodiment of a pellet in accordance with the invention with three different layers.
FIG. 16c a cross-sectional view of a further embodiment of a pellet in accordance with the invention with two different layers.

Schematic cross-sections of pellets 10 having three or two different layers 12 are shown in FIGS. 16a, 16b, and 16c. The different layers 12 can be connected to one another by soldering with a soldering film 30 or by pressing the layers 12 and can have different pores 26. In the middle layer 12, the pellet 10 of FIG. 16a has first pores 52 having larger diameters and second pores 54 having smaller diameters.

The diameter of the first pores 52 can be in the range of 500 μm to 10,000 μm and the diameter of the second pores 54 can be in the range of 10 μm to 3000 μm. Such a distribution of the pores 52, 54 can be used, for example, to influence the dwell time of reactants in the pellet 10. The smaller pores 54 in the interior of the pellet shown in FIG. 16b can thus, for example, increase the dwell time of reactants. With a pellet 10 made up of two different layers 12 (FIG. 16c), larger first pores 52 are provided in a layer 12 and smaller second pores 54 are provided in the other layer 12. The reactant flow 36 thus preferably enters into and departs from the pellet 10 from the side having the first pores 52. The dwell time within the pellet 10 can hereby be varied, for example. Since smaller pores 54 are provided at one side of the pellet 10 than at the other side of the pellet, some of the reactant flow 36 can be led off on impacting the pellet 10 at the side having the smaller pores 54, which in turn influences the fluid dynamics, whereby the heat transfer properties and mass transfer properties of a catalyst charge can be influenced.

Figure 17A:
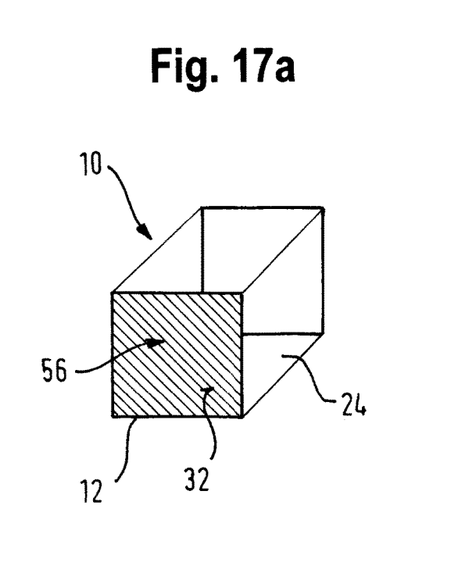
FIG. 17a a schematic representation of an embodiment of a pellet in accordance with the invention.

The pellet 10 shown in FIG. 17a has a closed outer surface 56. This means that no pores 20 lead into the interior of the pellet 10 at the closed outer surface 56 so that a reactant flow 36 flowing against the closed outer surface 56 cannot penetrate into the pellet 10 and therefore rebounds off the outer surface 32. Turbulence can hereby arise so that the heat transfer properties and mass transfer properties can also be influenced by the part or complete closing of an outer surface 32 of a pellet 10. In the pellet 10 shown in FIG. 17b, two oppositely disposed outer surfaces 56 are provided.

Figure 17B:
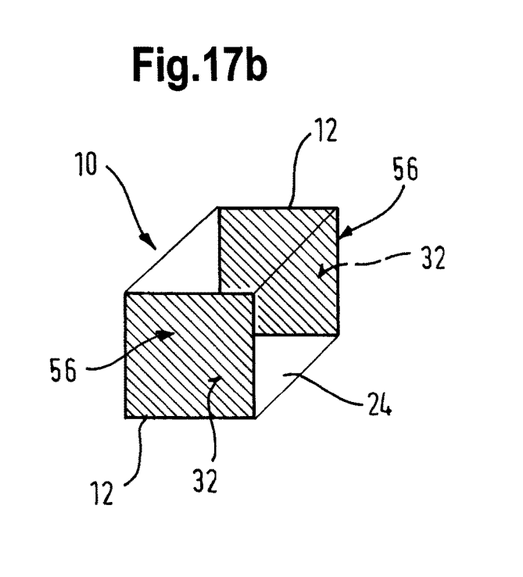
FIG. 17b a schematic representation of a further embodiment of a pellet in accordance with the invention.

A closed outer surface 56 can, for example, be produced by applying a soldering film 30 to an outer surface 32 of a pellet 10 and by a subsequent heating of the soldering film 30. It is also possible to produce inner boundary surfaces in a pellet 10, that can be partly or completely closed, in a metal foam material 14 having a plurality of layers 12 that are connected by means of soldering films 30. Partly or completely closed inner boundary surfaces likewise influence a reactant flow 36 that has penetrated into the pellet. The dwell time of the reactants within the pellet 10 can, for example, hereby be varied or turbulence can be produced in the reactant flow 36.

Figure 18:
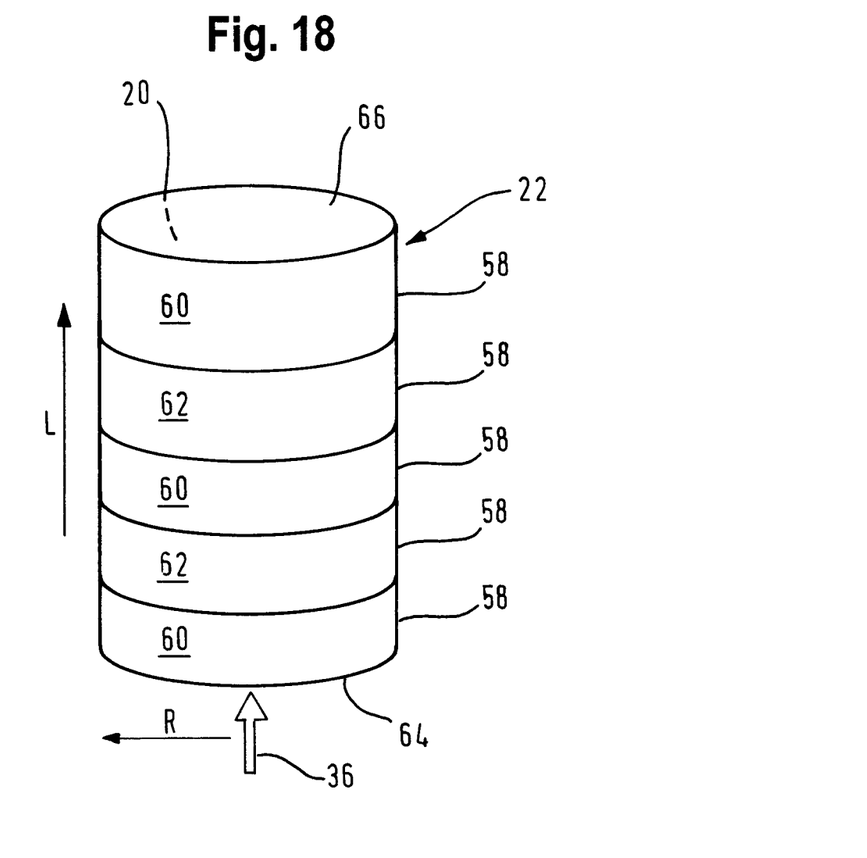
FIG. 18 a reactor with a catalyst charge.
Figure 19:
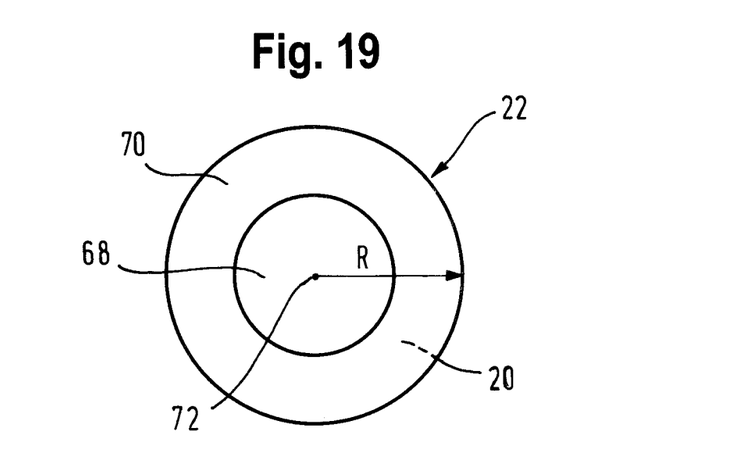
FIG. 19 a cross-sectional view of a reactor.

A reactor 22 flowed through by a reactant flow 36 is shown in a perspective view in FIG. 18. A catalyst charge 20 is provided in the interior of the reactor 22 and comprises a plurality of pellets 10, and indeed pellets 10 that differ with respect to their sizes, shapes, surfaces, densities, porosities, orientations and/or their materials, with the individual pellets 10 not being shown in FIGS. 18 to 20. The reactor 22 is specifically divided into a plurality of regions 58 in the axial direction L that differ with respect to their catalyst charges 20. A catalyst charge having pellets 10 that optimize the heat supply or removal properties of the reactor 20 can thus, for example, be included in a first region 60. In a second region 62, the catalyst charge can comprise pellets 10 that are, for example, optimized with respect to the mass transfer properties to convert the reactant flow 36 as completely as possible. In the reactor shown in FIG. 18, the first and second regions 60, 62 are arranged alternately along the axial direction L of the reactor 22 and thus form discrete layers having different compositions.

It is also conceivable that the catalyst filling 20 gradually changes along the axial direction L of the reactor 22. This means that a first kind or mixture of pellets 10 is provided in the region of a reactor inlet 64 in which the reactant flow 36 enters into the reactor 22 and a second kind or mixture of pellets 10 is provided in a region of the reactor outlet 66. The first kind or mixture of pellets 10 merges along the axial direction L of the reactor into the second kind or mixture of pellets 10. A different fluid-dynamic environment can hereby be provided at the reactor inlet 64 than at the reactor outlet 66.

The distribution of different pellets 10 in the catalyst charge can take place homogeneously, gradually, or in discrete rings in the radial direction R. It can be recognized in the cross-sectional view of a reactor shown in FIG. 19 that the catalyst charge 20 has a radially inner region 68 and a radially outer region 70. A different kind or a different mixture of pellets 10 can be provided in the radially inner region 68 than in the radially outer region 70. The transition between the radially inner region 68 and the regionally outer region 70 can take place abruptly so that the catalyst charge has discrete rings in the radial direction R. Alternatively, a gradual transition can take place between the inner region 68 and the outer region 70.

Figure 20:
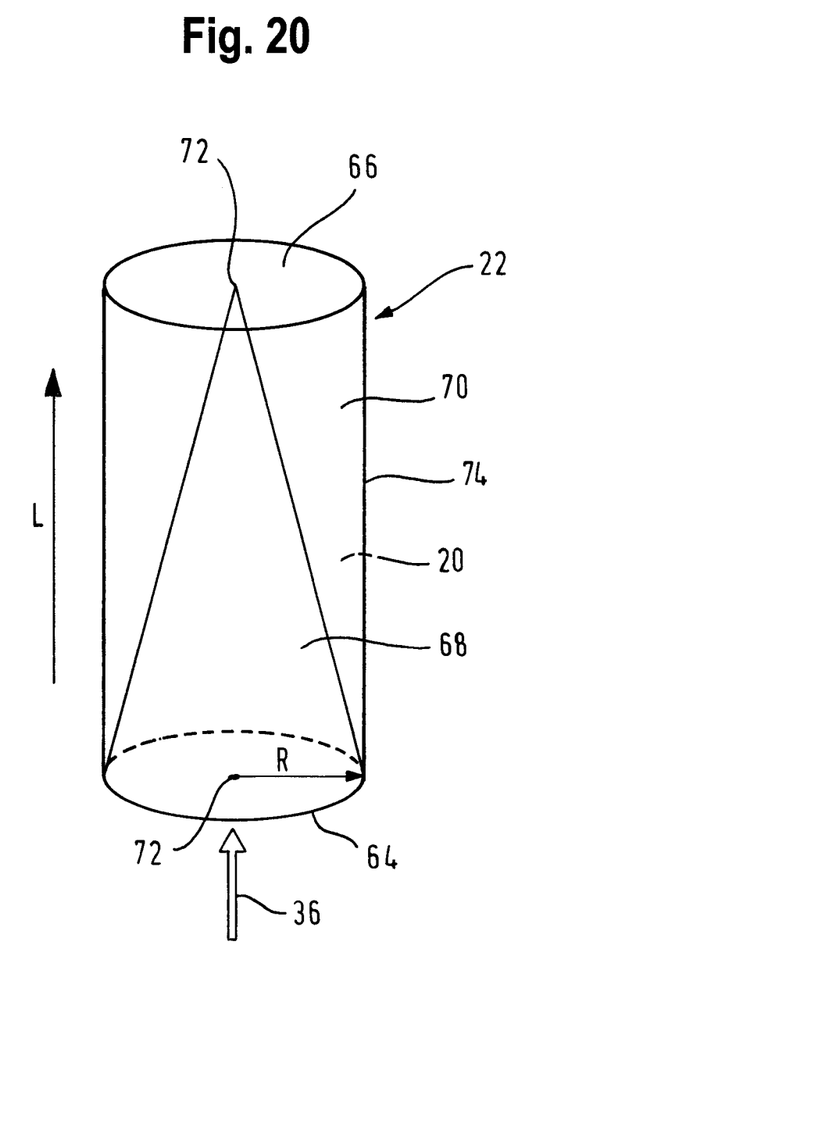
FIG. 20 a partly transparent view of a reactor with a catalyst charge.

A partly transparent view of a reactor is shown in FIG. 20 whose catalyst charge 20 changes gradually in the axial direction L and abruptly in the radial direction R. The inner region 68 extends at the reactor inlet 64 from the center 72 of the reactor 22 up to the reactor wall 74. The radius of the inner region 68 becomes continuously smaller along the axial direction L in the direction of the reactor outlet 66, whereas the thickness of an outer region 70 increases so that the inner region 68 has the shape of a cone viewed over the total length of the reactor 22.

Figure 21A:
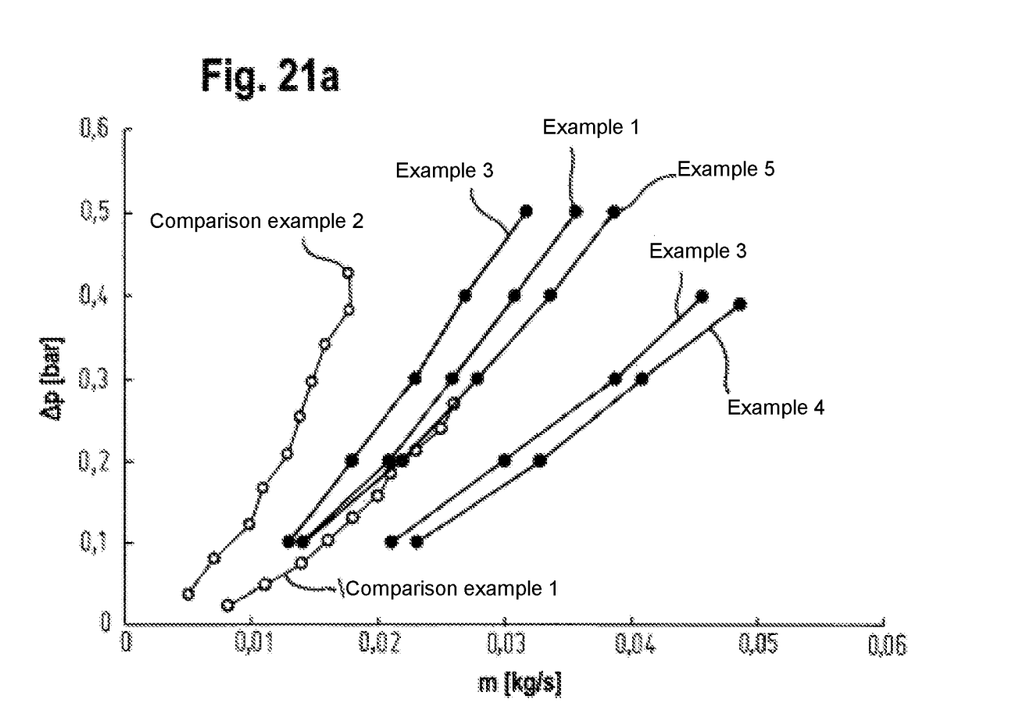
FIG. 21a pressure losses with predefined amount of substance flows for pellets of examples 1 to 5 and of the comparison examples 1 and 2.
Figure 21B:
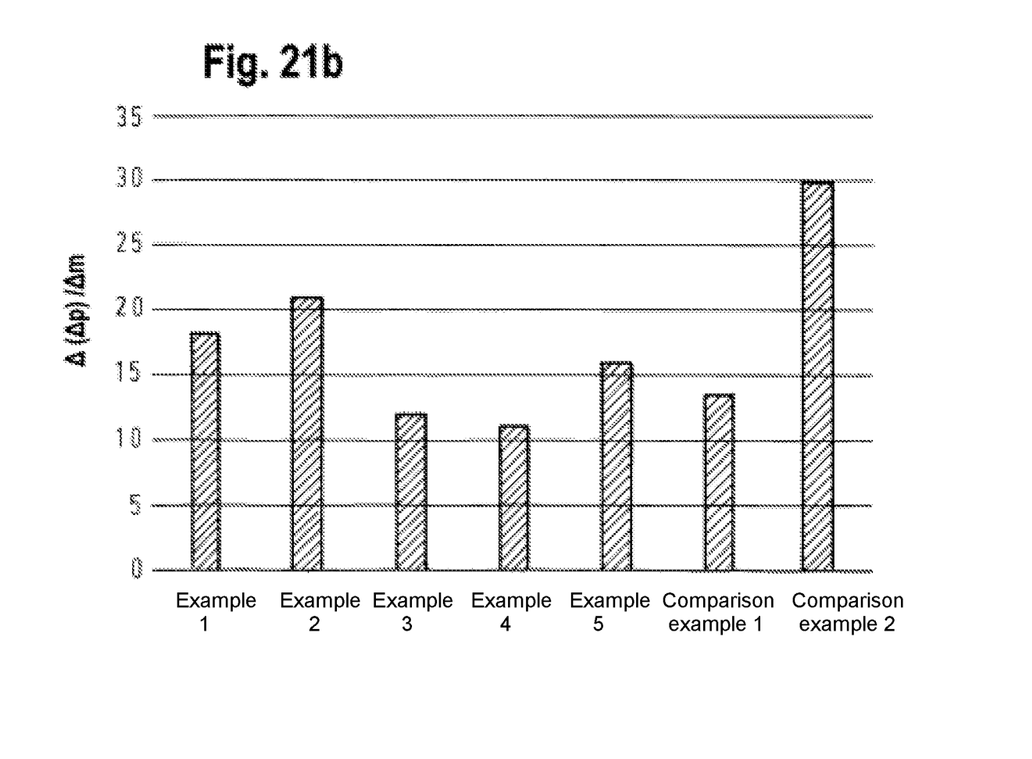
FIG. 21b pressure losses in dependence on the mass transport and mass transfer of examples 1 to 5 and comparison examples 1 and 2.

A comparison of pellets 10 composed of metal foam 24 with conventional ceramic pellets is shown in Tables 1 and 2 and in FIG. 21a and FIG. 21b.

Five examples for pellets 10 in accordance with the invention are listed in Table 1 with a cube or disk geometry that each comprise a nickel-chromium-aluminum alloy (Ni-CrAl) and two comparison examples of ceramic pellets that comprise calcium aluminate.

TABLE 1

|  | Shape | Dimensions (mm) | Pore size (μm) | Material |
| --- | --- | --- | --- | --- |
| Example 1 | Cube | 10 × 10 × 10 | 1200 | μm NiCrAl |
| Example 2 | Cube | 10 × 10 × 10 | 580 | μm NiCrAl |
| Example 3 | Cube | 15 × 15 × 15 | 1200 | μm NiCrAl |
| Example 4 [1] | Cube | 15 × 15 × 15 | 1200 | μm NiCrAl |
| Example 5 [2] | Disk | 8 × 8 × 3 | 1200 | μm NiCrAl |
| Comparison example 1 [3] | Hollow cylinder | 13 × 17 | 3500 | μm Calcium aluminate |
| Comparison example 2 [4] | Hollow cylinder | 8 × 8 | 3000 | μm Calcium aluminate |

[1] Cube with six layers, compressed by 20%
[2] Dimensions relate to length × width × thickness
[3] Cylinder with notches, a maximum outer diameter of 13 mm, a length of 17 mm, and four identical cylindrical hollow spaces having arched ends and an inner diameter of 3.5 mm in each case
[4] Hollow cylinder with an outer diameter of 8 mm, a length of 8 mm, and an inner diameter of 3.0 mm FIGS. 21a and 21b show the pressure loss properties for pellets 10 of Examples 1 to 5 and of Comparison examples 1 and 2. A measured pressure loss Δp is entered in bar over a set amount of substance flow m in kg/s for every example or comparison example in FIG. 21a. FIG. 21a shows that there is an approximately linear relationship between the pressure loss Δp and the set amount of substance flow m. In FIG. 21b, Δm represents the difference between the highest and lowest set amount of substance flows for an example or a comparison example and Δ(Δp) represents the difference between the pressure losses respectively measured at these amount of substance flows. The values Δ(Δp)/Δm in other words indicate the gradients of straight lines that extend through the start points and the end points of the curves shown in FIG. 21a and form a measure for the pressure loss per amount of substance flow for the examples or comparison examples. The higher the value for Δ(Δp)/Δm is, the greater the pressure loss becomes as the mass transport and mass transfer increase.

It can be recognized with reference to Examples 1 to 5 that pellets 10 can be produced by the method in accordance with the invention with different effects on the pressure loss, i.e. the pellets 10 can be easily adapted to the demands of their planned area of use. For example, a change of the pore diameters can be used to influence the pressure loss, as is shown with reference to Examples 1 and 2. The use of a pellet 10 having a plurality of layers 12 reduces the pressure loss and simultaneously improves the mass transfer properties, as can be recognized with reference to Examples 3 and 4. Both the pressure loss and the mass transfer can be optimized in dependence on the purpose of use of the pellets 10 by a change of the shape of the pellets 10. The disk-shaped pellet 10 in accordance with Example 5 has equally good mass transfer properties as a pellet in accordance with Example 3, but with an increased pressure loss.

Figure 22A:
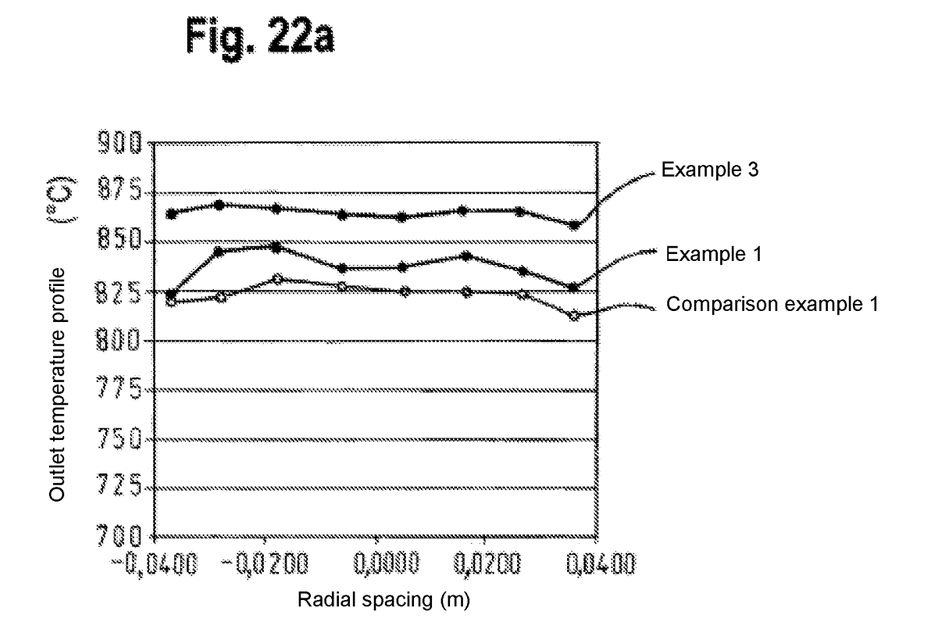
FIG. 22a three outlet temperature profiles for three reactors packed with pellets.

FIG. 22*a* shows three radial outlet temperature profiles. For this purpose, tubular reactors 22 having diameters of 3 inches (7.62 cm) are flowed through after their packing by different pellets 10 with air preheated to 900° C. as a fluid at a pressure of 5 bar and a superficial velocity of 1 m/s, with the reactors 22 each being arranged in furnaces heated to 1000° C. A measurement of the temperature at different radial positions takes place at the reactor outlet 66. The outlet temperature profiles shown in FIG. 22*a* are obtained by applying the measured outlet temperatures against the associated radial positions.

The lower curve marked by diamonds in FIG. 22*a* is obtained using ceramic pellets in accordance with Comparison example 1 (Table 1). Two outlet temperature profiles obtained with pellets 10 composed of metal foam 24 are marked by circles (upper curve) or by triangles (middle curve) and are each based on cubiform pellets that comprise a nickel-chromium-aluminum alloy. In the outlet temperature profile marked by circles, the cubiform pellets 10 correspond to the pellets of Example 3. In the outlet temperature profile marked by triangles, the cubiform pellets 10 correspond to the pellets of Example 1. Both outlet temperature profiles that are due to the use of pellets 10 composed of metal foam 24 have higher temperatures than the outlet temperature profile based on the use of ceramic pellets. This illustrates that the pellets 10 composed of metal foam are in particular advantageous with highly endothermic reactions in comparison with ceramic pellets.

Figure 22B:
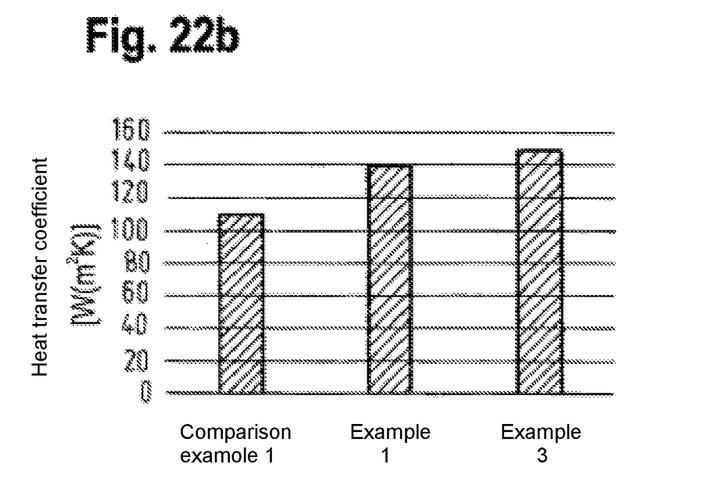

Mean heat transfer coefficients that are shown in FIG. 22*b* can be calculated from the obtained outlet temperature profiles. The heat transfer coefficient of the reactor 22 packed with ceramic pellets is shown at the left in FIG. 22*b* and is considerably lower than the mean heat transfer coefficients that are due to the pellets in accordance with Examples 1 and 3. This shows that the heat transfer of reactors can be optimized by the pellets 10 in accordance with the invention composed of metal foam 24.

REFERENCE NUMERAL LIST

10 pellet
12 layer
14 metal foam material
16 metal foam blank
18 metal foam material piece
20 catalyst charge
22 reactor
24 metal foam
26 pores
28 indentation
30 soldering film
32 outer surface
34 groove
36 reactant flow
38 protrusion
40 indentation
42 opening
44 jacket wall
46 inner side
48 outer jacket surface
50 inner jacket surface
52 first pores
54 second pores
56 closed outer surface
58 region
60 first region
62 second region
64 reactor inlet
66 reactor outlet
68 radially inner region
70 radially outer region
72 center
74 reactor wall
L axial direction
R radial direction
S1 first method step
S2 second method step
S3 third method step
S4 fourth method step

The invention claimed is:

1. A pellet comprising at least one layer of metal foam, the pellet having a volume of 0.8 mm$^3$ to 15 cm$^3$ and having a porosity greater than or equal to 70% as viewed in a transverse cross-section.

2. The pellet in accordance with claim 1, further comprising at least one outer-side indentation and/or groove and/or at least one winding and/or twist of a layer of metal foam.

3. The pellet in accordance with claim 1, wherein at least one outer surface and/or one inner boundary surface of the pellet is at least partly closed.

4. The pellet in accordance with claim 1, wherein the pellet comprises at least two layers of different metal foam.

5. The pellet in accordance with claim 1, wherein the pellet at least substantially comprises metal foam.

6. The pellet in accordance with claim 1, wherein the metal foam has pores having diameters that are distributed in a monomodal or multimodal manner.

7. The pellet in accordance with claim 6, wherein the metal foam has pores having diameters that are distributed in a bimodal manner.

8. The pellet in accordance with claim 1, wherein the metal foam has pores having a diameter of 10 μm to 10,000 μm.

* * * * *